Dec. 22, 1936.  A. LANGSNER ET AL  2,065,472
PIN MOUNTING
Filed Jan. 18, 1935
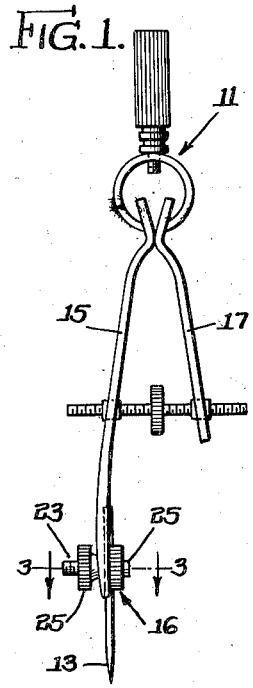
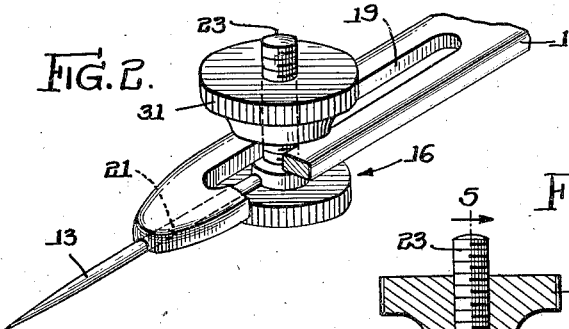
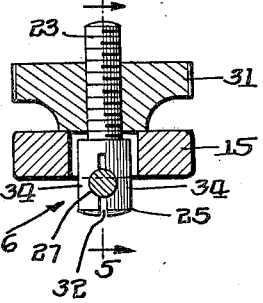
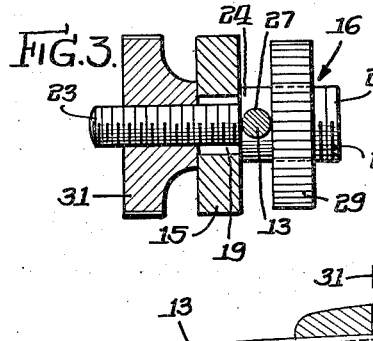
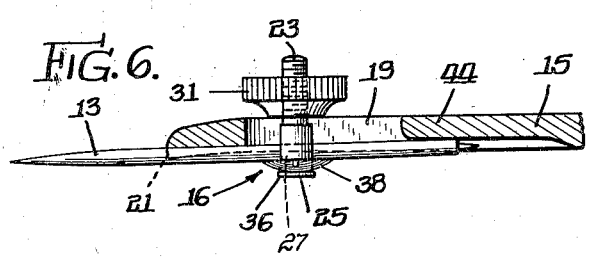
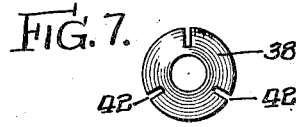
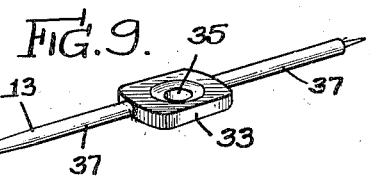
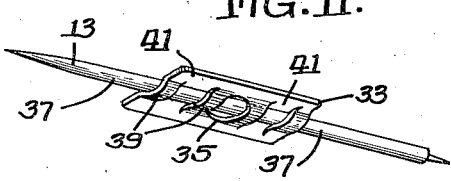
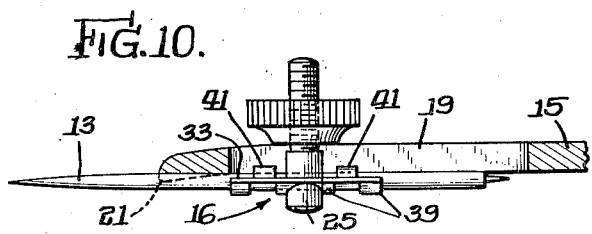
Inventors:
Adolph Langsner
William H. Lerch
By:— Cox & Moore  attys Patented Dec. 22, 1936

2,065,472

UNITED STATES PATENT OFFICE 2,065,472

PIN MOUNTING

Adolph Langsner and William H. Lerch, Chicago, Ill., assignors to Eugene Dietzgen Company, Chicago, Ill., a corporation of Delaware Application January 18, 1935, Serial No. 2,323

8 Claims. (Cl. 33—152)

Our invention relates in general to drawing and measuring instruments and has more particular reference to novel means for mounting pointed pins, more especially on compasses, dividers, and the like.

An important object of the invention is to provide an adjustable mounting for pointed pins and the like, whereby the pin may be adjusted on its support and secured in adjusted position without being touched during the adjusting operation to thereby eliminate the possibility of injury to the pin and to the person accomplishing the adjustment; a further object being to provide an adjustable mounting for the pin including a member shiftable on the support including means to secure the member in adjusted position, the member having means to carry the pin substantially rigidly thereon whereby the same may be adjusted axially on the support by movement imparted to the member.

Another important object is to form the adjustable pin-carrying member as a stem adapted to extend through an elongated slot formed in the support on which the same is mounted and formed with a diametral opening in which the pin extends and means associated with the stem for clamping the pin in the diametral opening so that the pin may be carried by the stem and axially adjusted on the support by moving the stem in the slot and without touching the pin.

Another important object is to mount the pin on its carrying member by forming the stem with a diametral opening, in which the pin may fit more or less loosely and providing means connected on the stem for tightly securing the pin in place.

Another object is to provide for securing the pin on the stem by clamping it in a diametral opening formed in the stem, the clamping of the pin being accomplished by means of a threaded nut applied to the stem in position to bear upon the portions of the pin projecting at opposite ends of the diametral opening.

Another important object is to utilize resilient means on the stem for anchoring the pin in place thereon.

Another object is to provide for securing the pin on the stem by forming the pin on a plate-like element having a perforation for receiving the stem and then securing the plate-like element on the stem by inserting and securing the stem in said opening.

Another important object is to provide for removably connecting the pin on the plate-like element and to utilize the pin for the purpose of holding the plate-like element on the stem.

Another important object is to form the pin as an integral part of the plate-like element.

Numerous other objects, advantages, and inherent functions of the invention will become apparent as the same is more fully understood from the following description, which, taken in connection with the accompanying drawing, discloses preferred embodiments of the invention.

Referring to the drawing:

Figure 1 is a partial view of a drawing instrument provided with a pin mounting embodying our present invention, including means to lock the pin on the adjustable stem;

Figure 2 is an enlarged perspective view of the pin mounting shown in Figure 1;

Figure 3 is an enlarged sectional view taken substantially along the line 3—3 in Figure 1;

Figure 4 is a sectional view similar to the showing of Figure 3 and illustrating a modified construction of the pin mounting, wherein resilient means is employed for securing the pin on the stem;

Figure 5 is a sectional view taken substantially along the line 5—5 in Figure 4;

Figure 6 is a sectional view, similar to the showing in Figure 5, illustrating a pin mounting embodying a modified arrangement of the resilient means for securing the pin on the stem;

Figure 7 is a perspective view of the resilient means utilized in the form shown in Figure 6;

Figure 8 is a sectional view, similar to the showing in Figures 5 and 6, showing a modified arrangement of the pin mounting embodying a plate-like bearing block and integral pin.

Figure 9 is a perspective view of the bearing block and integral pin.

Figure 10 is a sectional view, similar to the showing of Figure 8, illustrating a modified arrangement of the pin and mounting plate; and Figure 11 is a perspective view illustrating the pin and mounting plate embodied in the form shown in Figure 10.

To illustrate the invention, we have shown on the drawing an instrument 11, which may be a compass, divider, or other instrument, on which a pin 13 is mounted for axial adjustment thereon. The instrument shown has a leg 15, on which the pin 13 is adjustably supported by means of a mounting 16 embodying our present invention. The illustrated instrument also has another leg 17, which may carry a marking device where the instrument comprises a compass, or the leg 17 may carry another pointed pin if adapted for use as a divider. It is obvious that a pin of the character mentioned will frequently have to be adjusted on the leg 15, such adjustment being more particularly necessary where the instrument 11 comprises a compass, in which the scribing device carried by the leg 17 may become worn in service, necessitating adjustment of the pin 13 on the leg 15 in order to compensate for such wear.

We have provided a mounting, by means of which the pin may be quickly and easily adjusted on the leg without touching the same during the adjustment, the mounting providing means for securing the pin in adjusted position. The mounting, moreover, permits adjustment of the pin and clamping of the same in adjusted position simultaneously and to this end, the leg 15 is provided with an elongated opening 19 terminating short of the end of the pin and in which the inner end of the pin may extend when the same is in mounted position on the leg. The inner face of the leg also is preferably provided with a groove 21 extending from the end of the opening 19 to the end of the leg 15.

The clamping and adjusting device comprises a bolt or stem 23, which extends through the elongated slot 19 and is movable therein longitudinally of said leg. The bolt or stem has a threaded end projecting outwardly of the leg on one side thereof, the opposite end of the stem comprising a head 25 projecting on the opposite side of the leg.

The head 25 is provided with means for securing the pin detachably though firmly and positively on the stem. After the pin is so mounted in the head 25, the stem may be assembled through the slot in oriented position such that the pin portions, projecting on one side of the stem, extend in the groove 21, the extremity of the pin projecting outwardly of the end of the leg. A stem clamping nut 31, or other suitable clamping device, may be applied to the end of the stem opposite from the head 25, said clamping nut 31 serving, when screwed down on the stem, to secure the stem in adjusted position in the slot 19.

As shown in Figures 1, 2, and 3, the head 25 is preferably, though not essentially, slightly enlarged to provide a shoulder 24 adapted to bear upon the surface of the leg on opposite sides of the slot 19. This enlarged head contains a substantially diametral perforation 27 adapted to receive the pin 13 and the head is threaded as at 28 to receive a clamping device comprising a nut 29 adapted to be screwed onto the head into position to engage the pin portions projecting on opposite sides of the stem and to firmly and rigidly clamp the same in place on the stem.

In Figures 4 through 7, we have shown how the pin 13 may be detachably though firmly mounted on the stem 23 by resilient means instead of by the positive screw threaded nut 29 employed in the arrangement shown in Figures 1, 2, and 3.

As shown in Figures 4 and 5, the head is provided with a diametral channel 27 and is split longitudinally as at 32, the split lying substantially in a plane passing through the axis of the channel 27 and dividing the head into resilient fingers 34 adapted to press firmly upon the sides of the pin 13, when the same is mounted in the channel 27 and hold the same in place.

As shown in Figure 6, the head is formed with a diametral perforation 27 adapted to receive the pin and a seat facing said perforation and formed by projecting means, 36 formed on the head, adjacent the perforation 27. A resilient member 38, preferably an annular washer having peripheral slits 42, as shown in Figure 7, may, if desired, be assembled on the stem and engaged in the seat in position to resiliently engage the pin 13 when the same is inserted in the channel 27 and firmly hold the pin in place.

If desired the stem, in the forms shown in Figures 4 through 7, may be provided with an enlarged shoulder similar to the shoulder 24 shown in the form illustrated in Figures 1, 2, and 3. We prefer, however, to provide the leg 15 with a projection 44 extending in the slot 19 in position to engage the end of the pin extending in the slot so that when the clamping nut 31 is tightened, the pin will be drawn, at its opposed ends on opposite sides of the head, snugly into the groove 21 and against the projection 44. It is particularly desirable to utilize this arrangement where the pin is resiliently anchored on the stem, since the pin is thus not only anchored on the stem but, when the clamp nut 23 is tightened, the pin is actually clamped directly on the leg.

We, however, contemplate the possibility of using a clamping shoulder in the forms shown in Figures 4 through 7 as well as the possibility of eliminating the clamping shoulder from the form shown in Figures 1, 2, and 3 as well as in the forms shown in Figures 8 through 11 and hereinafter described. Where the clamping shoulder 24 is eliminated, however, it is usually preferable to form the leg with the clamping tongue 44.

In Figures 8 through 11, the pin 13 is attached to a plate-like portion 33, which, in turn, is mounted on and secured to the headed end of the stem in such a way that radial movement of the plate and the pin, with respect to the stem, is substantially prevented and the pin is, as a practical matter, rigid with the stem. The plate-like portion 33 is formed with a preferably centrally located perforation 35 of a size adapted to receive the head of the stem and the pin 13 comprises portions 37 extending in alignment in opposite direction from the opposite ends of the plate. As shown in Figures 8 and 9, the pin portions 37 are formed integrally with the plate 33 and the head 25 of the stem is provided with a seat in its end so that, when the stem is inserted through the perforation 35 of the plate, the head will serve to hold the plate and the pin 13 in position on the leg 15.

As shown in Figure 10, the pin 13 may be formed as an element separate from the plate-like portion 33, which, in such case, is preferably formed with a shallow groove 39 extending longitudinally of the plate in line with the perforation 35. The plate 33 also has struck-out portions forming straps 41 extending across the groove 39 on opposite sides of the perforation so that the pin may be mounted firmly on the plate in position extending in the groove 39 and held in place by the straps 41. When so mounted on the plate, the pin extends diametrally through a perforation 27 formed in the head 25 of the stem. The pin may be mounted by first assembling the stem in the opening 35 of the plate and by then passing an end of the pin in the groove 39 successively behind one of the straps 41, thence through the perforation 27 of the stem, and thence behind the other strap 41. The pin, when in assembled position, projects at its opposite ends from the plate and is not only firmly mounted on the plate, but also serves to secure the plate on the stem. The plate 33 also forms a bearing block adapted to engage the spaced leg portions on opposite sides of the slot 19 and to clamp the parts in adjusted position when the lock nut 23 is tightened. The plate 33, when mounted on the pin, thus forms a clamping shoulder comparable to the shoulder 24 shown in Figures 1, 2, and 3.

It will be noted that the embodiments illustrated in Figures 8 through 11, as well as the embodiments illustrated in Figures 1 through 7, provide for the mounting of the pin in a substantially rigid manner firmly upon the stem and that the stem, carrying the mounted pin, may be assembled in the slot 19 for longitudinal movement therein, the clamping nut 31 in each case serving to secure the stem and the substantially rigidly carried pin in adjusted position on the leg. It will be seen also that the pin may be adjusted on the leg by merely moving the stem in the slot 19 and that such adjusting movement of the stem may be accomplished simply by loosening the nut 31 on the stem and moving the stem in the slot 19 to a desired position and then clamping the stem and the pin carried thereby in adjusted position by tightening the nut 31. It is obvious that the adjustment as well as the clamping operation is accomplished solely by manipulating the nut 31 and without directly touching the pin or its pointed end.

It is thought that the invention and numerous of its attendant advantages will be understood from the foregoing description; and it is obvious that numerous changes may be made in the form, construction, and arrangement of the several parts of the illustrated apparatus without departing from the spirit or scope of the invention or sacrificing any of its attendant advantages; the preferred modes and forms, herein described and shown, being disclosed merely for the purpose of illustrating the invention.

Having thus described our invention, what we claim as new and desire to secure by Letters Patent is as follows:

1. The combination with a support element, of support means comprising a stem longitudinally adjustable on said support element and having a substantially diametral opening adapted to receive a pin projecting on opposite sides of the stem, resilient plate-like means having a perforation for receiving said stem, said plate-like means having portions extending on opposite sides of said perforation in position to engage the pin to yieldingly secure the pin on the stem when the plate is assembled on the stem, and threaded means co-operatively associated with said stem for clamping the same in adjusted position on the support element.

2. The combination with a support element, of support means comprising a stem longitudinally adjustable on said support element and having a substantially diametral opening adapted to receive a pin in position extending on opposite sides of said stem, means comprising a resilient disk having a perforation, whereby the same may be mounted on said stem in position with the edges of the disk bearing upon the pin on opposite sides of said stem whereby to secure the pin yieldingly against axial movement in said diametral opening, and threaded means co-operatively associated with said stem for clamping the same in adjusted position on the support element.

3. The combination, with a support element having an elongated slot, of support means comprising a stem mounted, in said slot, for guided movement along said slot with respect to said support element, said stem having a threaded portion extending on one side of said support element and a diametral opening in position to receive a pin, projecting on opposite sides of the stem, on the side of the support element opposite from the threaded portion of said stem, said opening being formed to permit axial movement of the pin therein whereby the pin may be adjusted axially with respect to the stem, means on the stem serving to hold the pin in adjusted position in said opening against axial movement of the pin with respect to the stem, and threaded means cooperatively associated with said stem for clamping the stem and the pin carried therein in adjusted position on the support element.

4. The combination, with a support element having an elongated slot, of support means comprising a stem mounted, in said slot, for guided movement along said slot with respect to said support element, said stem having a threaded portion extending on one side of said support element and a diametral opening in position to receive a pin, projecting on opposite sides of the stem, on the side of the support element opposite from the threaded portion of said stem, resilient means on said stem in position to yieldingly secure the pin in said diametral opening, and threaded means cooperatively associated with said stem for clamping the same and said pin in adjusted position on the support element.

5. The combination, with a support element having an elongated slot, of support means comprising a stem mounted, in said slot, for guided movement along said slot with respect to said support element, said stem having a threaded portion extending on one side of said support element and a diametral opening in position to receive a pin, projecting on opposite sides of the stem, on the side of the support element opposite from the threaded portion of said stem, a resilient washer element on said stem in position yieldingly engaging said pin to secure the same in said diametral opening, and threaded means cooperatively associated with said stem for clamping the same and said pin in adjusted position on the support element.

6. The combination, with a support element having an elongated slot, of support means comprising a stem mounted, in said slot, for guided movement along said slot with respect to said support element, said stem having a threaded portion extending on one side of said support element and a diametral opening in position to receive a pin, projecting on opposite sides of the stem, on the side of the support element opposite from the threaded portion of said stem, a plate on said stem having a perforation to receive the stem, openings for the reception of the pin on opposite sides of the stem whereby yieldingly to secure the pin in position in said diametral opening of the stem, and threaded means cooperatively associated with said stem for clamping the same and said pin in adjusted position on the support element.

7. The combination, with a support element having an elongated slot, of support means comprising a stem mounted, in said slot, for guided movement along said slot with respect to said support element, said stem having a threaded portion extending on one side of said support element and a diametral opening in position to receive a pin, projecting on opposite sides of the stem, on the side of the support element opposite from the threaded portion of said stem, means adapted for assembly on said stem in position engaging the pin on opposite sides of the stem to secure the pin in place in said diametral opening, and threaded means cooperatively associated with said stem for clamping the same and said pin in adjusted position on the support element.

8. The combination, with a support element having an elongated slot, of support means comprising a stem mounted, in said slot, for guided movement along said slot with respect to said support element, said stem having a threaded portion extending on one side of said support element and a diametral opening in position to receive a pin, projecting on opposite sides of the stem, on the side of the support element opposite from the threaded portion of said stem, said stem having a diametral slit substantially in the axial plane of said diametral opening, providing resilient stem portions on opposite sides of said opening adapted to resiliently press upon and secure the pin yieldingly in place in said diametral opening, and threaded means cooperatively associated with said stem for clamping the same and the pin in adjusted position on the support element.

ADOLPH LANGSNER.
WILLIAM H. LERCH.